March 31, 1959 V. N. PETERSON 2,879,619
FISH LINE LEADER, HOOK, SWIVEL AND SHOT HOLDER
Filed Sept. 27, 1956
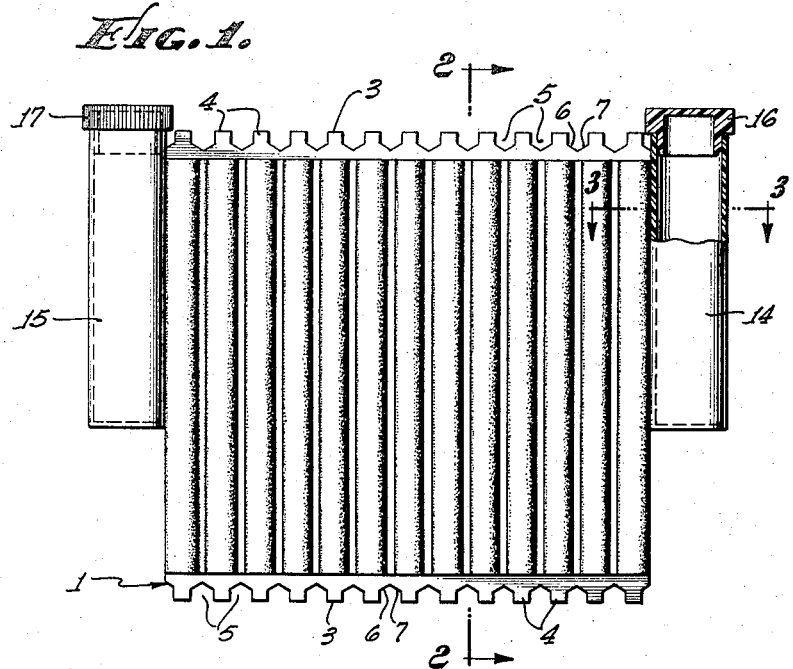
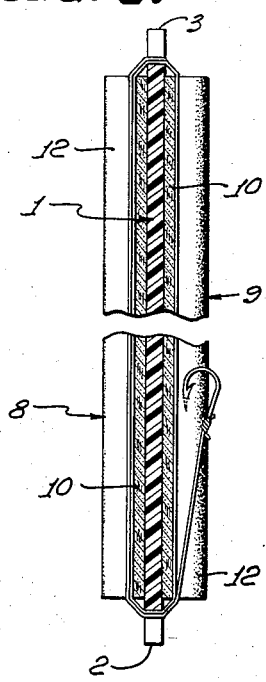
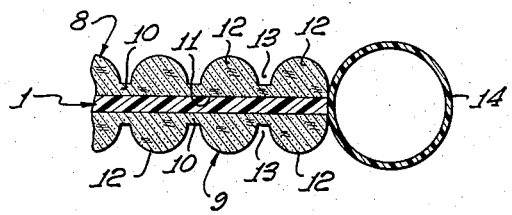
INVENTOR,
VICTOR N. PETERSON;
BY
ATTORNEY.

United States Patent Office 2,879,619
Patented Mar. 31, 1959

2,879,619

FISH LINE LEADER, HOOK, SWIVEL AND SHOT HOLDER

Victor N. Peterson, Los Angeles, Calif.

Application September 27, 1956, Serial No. 612,539

8 Claims. (Cl. 43—57.5)

The present invention relates to a fish line leader, hook, swivel and shot holder of a size which is convenient to carry in the pocket, and to securely hold the leader with its hook and associated elements without damage to said elements and without harm to the fisherman.

Generally, fishermen require many different flies and hooks, with associated leaders, in fishing for given varieties of fish. As a rule, the hooks may vary in size as may likewise the length of the leaders and different flies may be necessary. The present invention provides a means which readily accommodates, for transportation, the necessary equipment for the fisherman for attachment to the main fishline.

The invention has for an object a holder for fishline leaders and associated elements, which is efficient in operation, secures the leader and its hook in such a manner that the leader and hook are not damaged during any transportation, which is easy to use, in that the leader and hook are readily secured thereto or released therefrom, which is inexpensive in cost of manufacture, and generally superior to devices for this purpose now known to the inventor.

With the above mentioned and other objects in view, the invention consists in the novel and useful provision, formation, construction, association, and relative arrangement of parts, members and features, all as shown in one embodiment in the accompanying drawing, described generally, and more particularly pointed out in the claims.

In the drawing:

Figure 1 is a side elevation of the invention, certain parts being shown in cross section, Figure 2 is a sectional view on the line 2—2 of Figure 1, and, Figure 3 is a fragmentary sectional view on an enlarged scale, taken on the line 3—3 of Figure 1.

Referring now with particularity to the drawing, the invention includes a holder 1 which may take the form of a flat plate of substantially rectangular form, and which may be formed from any suitable material, such as a thermo-plastic, a poly-styrene, with its opposite longitudinal parallel edges serrated, as shown at 2 and 3, to provide what may be termed a plurality of spaced apart teeth, tines or prongs, designated generally as 4, with intervening grooves 5 therebetween. The bounding base of each groove may take any form desired, such as curved or angular, and in the present instance, the bases are shown as having angular faces 6 and 7. The grooves on each side, as well as the teeth, tines or prongs, are in alignment, as shown in Figure 1.

Members designated generally as 8 and 9 are placed on opposite faces of the holder 1. The members 8 and 9 are preferably formed from blocks of some soft penetratable material, such as a foam plastic, cork, sponge rubber, and each member 8 and 9, the members being of identical form, include a base portion 10, one surface 11 of which is adapted to be secured to a surface of the holder 1 by gluing, heat application, or otherwise, while the opposite surface is provided with a series of elongated, half-round portions or ribs 12, in spaced apart relationship, to provide flat-bottom grooves at 13, the grooves of which are parallel. As shown in Figure 1, the half-round portions 12 do not extend the full width of the holder 1, but terminate inwardly from the serrated edges. The grooves 13 between each half-round portion 12 are in alignment with the grooves 5 of the serrated edges; in fact, the grooves 13 if continued would pass through the intersection of the angular faces 6 and 7.

Roughly speaking, it may be said that the external surface of the said members 8 and 9 are corrugated. However, the convex surface of each corrugation has greater arc than the intermediate grooves separating the convex surfaces. It is within the purview of the invention, however, to separate the convex portions any suitable distance to provide different widths of grooves 13. The grooves should be in alignment with the grooves 5 along the edges of the holder 1 and the half-round or convex portions should subtend as large an arc as possible so as to protect the leader which is received within the grooves 13 and the hook or hooks which penetrate the half-round portions 12.

At each end of the holder 1, and secured to the end walls or edges, are plastic bottles 14 and 15 provided with plastic caps 16 and 17, respectively.

The operation, uses and advantages of the invention just described are as follows:

The plastic bottles which are preferably transparent, may be used for holding various articles such as fishline swivels, hooks, lead shot and lures. The leader usually has a permanently looped end for connection with the main fishline, and this looped end is passed over one of the teeth, tines or prongs 2, and the leader then wrapped around the holder in the grooves 5 of the serrated edges and received in certain of the grooves 13 between the half-round portions 12. As the blocks 8 and 9 terminate about on line with the bottoms of the spaces between adjacent teeth 4 there is no sharp bend to the leader. The hook, on the end of the leader, impales one of the half-round portions, as such half-round portion or portions is formed of material which will not damage the hook point in that it is formed of a sponge plastic, foam rubber, cork, or other suitable material.

In Figure 2, I have illustrated the leader or snell received in oppositely positioned grooves 13, between parallel half-round portions 12 on each side of the holder 1, with the hook impaled in one of said half-round portions. It is quite obvious from this showing that the leader or snell is thoroughly protected against abrasion or damage, as is likewise the hook.

By way of illustration, Figures 1 and 2 illustrate a holder which will accommodate 12 leaders or snells and their respective hooks, together with any lead shot which is attached to the leader. This lead shot may be positioned in the groove or grooves 13. Further, Figures 1 and 2 illustrate an actual size of a holder for holding 12 leaders and their respective hooks, and it will be noted that a device of this size may be readily accommodated within the pocket of a fisherman.

I claim:

1. A leader holder including a flat plate having two parallel edges provided with serrations, and opposite surfaces of said plate being provided with soft penetrable corrugated members covering the major portion of the plate but terminating short of the serrations, the grooves of which are in alignment with the grooves of the serrations.

2. A fishline holder including a flat plate of substantially rectangular form, the two longest edges of which are provided with aligned serrations, the opposite surfaces of said flat plate being provided with spaced apart, parallel, elongate, half-round members formed of soft penetrable material, and the arrangement being such that the space between each half-round portion is in alignment with the proximate groove of the serrated edge with ends of said half-round portions terminating inwardly of the serrated edges.

3. A fish line holder, including a flat plate having two substantially parallel, spaced-apart edges provided with aligned serrations, a pair of penetratable members of identical form for opposite surfaces of said flat plate, said penetratable members each including a base portion adapted to be secured to a surface of the flat plate, the external surface of each of said members provided with a series of elongated, parallel, half-round portions in separated relationship to provide parallel grooves, the said grooves being in alignment with the serrations of the flat plate.

4. A leader holder suitable for inserting in a fisherman's pocket, comprising a plate having at its top and bottom edges a series of spaced teeth, a block of soft penetrable material on each side of said plate and terminating short of the teeth both at top and bottom, said blocks each having a series of half-round ribs spaced apart to form a series of vertical grooves alined with the spaces between the teeth of the plate, whereby leaders of any length may be quickly placed on the leader holder by hooking the looped end of the leader over any tooth, winding the leader around the holder in the alined grooves and spaces and finally impaling the point of the hook in either proximate rib, thus holding the leader taut and readily removable.

5. The holder of claim 4 in which the tops and bottoms of the blocks are flat and proximate the bottoms of the space between the teeth to avoid undue sharp bends in the leaders when wound on the holder.

6. A leader holder comprising a plate having a top edge and a bottom edge with spaced teeth on said edges and a plurality of spaced round ribs on the sides of the plate, in registry with said teeth and terminating short of the teeth both at top and at bottom so that a series of parallel, continuous grooves is formed in the holder, each groove including the space between adjacent ribs and the space between adjacent teeth, said ribs being of a material readily to receive the point of the hook of the leader.

7. The holder of claim 6 in which the plate is of plastic and is rectangular, the ribs are portions of two similar blocks of soft penetrable material extending from side to side of the plate and terminating short of the bottoms of the spaces between the teeth.

8. The holder of claim 7 in which the teeth have parallel sides to engage the looped end of the leader, the spaces between the teeth have angular faces meeting at points in alinement with the grooves between the ribs, the ribs extend unbroken from top to bottom of the blocks, and the space between ribs has a flat surface which is a portion of the block.

References Cited in the file of this patent
UNITED STATES PATENTS

| | | |
|---|---|---|
| 578,458 | Knieriemen | Mar. 9, 1897 |
| 1,490,370 | Figley | Apr. 15, 1924 |
| 2,530,292 | Crook | Nov. 14, 1950 |
| 2,604,721 | Casciano | July 29, 1952 |
| 2,730,833 | Newell | Jan. 17, 1956 |